United States Patent [19]

Hayashi et al.

[11] Patent Number: 4,528,340

[45] Date of Patent: Jul. 9, 1985

[54] PROCESS FOR PRODUCING HYDROPHILIC POLYMERS

[75] Inventors: Osamu Hayashi, Chiba; Hideo Kurihara; Yukio Matsumoto, both of Ichihara, all of Japan

[73] Assignee: UBE Industries, Ltd., Yamaguchi, Japan

[21] Appl. No.: 645,501

[22] Filed: Aug. 29, 1984

[51] Int. Cl.$^3$ .............................................. C08F 8/32
[52] U.S. Cl. ................................. 525/379; 525/381; 525/382; 525/386; 525/387; 525/329.3; 525/331.7; 525/332.8; 525/332.9; 525/333.1; 525/333.2
[58] Field of Search ............... 525/379, 381, 382, 386, 525/387

[56] References Cited

U.S. PATENT DOCUMENTS

| | | | |
|---|---|---|---|
| 3,970,608 | 7/1976 | Furukawa et al. | 525/383 |
| 4,173,593 | 11/1979 | Smith et al. | 525/529 |
| 4,282,207 | 8/1981 | Young et al. | 424/78 |
| 4,309,516 | 1/1982 | Schultz et al. | 525/379 |
| 4,356,278 | 10/1982 | Daimer et al. | 525/382 |

*Primary Examiner*—Bernard Lipman
*Attorney, Agent, or Firm*—Burgess, Ryan & Wayne

[57] ABSTRACT

A hydrophilic modified diene polymer material is produced by the steps of epoxidizing a diene polymer material consisting of at least one member selected from rubber polymers which have a molecular weight of 10,000 or more and contain an 85 molar % of more 1,4-addition structure based on the entire molar amount of double bonds contained therein, and crystalline 1,2-polybutadiene polymers which have a melting point of from 60° C. to 170° C., and a reduced viscosity (nsp/c) of 0.2 or more determined in a tetrahydronaphthalene solution in a concentration of 200 mg/100 ml at a temperature of 100° C., and contain a 75 molar % or more 1,2-addition structure based on the entire molar amount of double bonds contained therein, for example, with a combination of a carboxylic acid and a peroxide compound, or a carboxylic peracid, to an extent such that the degree of epoxidization of the rubber polymers is in the range of from 5% to 60% and the degree of epoxidization of the crystalline 1,2-polybutadiene is in the range of from 5% to 45%; and ring-opening at least a portion of the epoxy rings in the resultant epoxidized polymeric material by heating it in the presence of a tertiary amine and a carboxylic acid.

17 Claims, No Drawings

PROCESS FOR PRODUCING HYDROPHILIC POLYMERS

BACKGROUND OF THE INVENTION

1. Field of the Invention

The present invention relates to a process for producing hydrophilic polymers. More particularly, the present invention relates to a process for producing novel hydrophilic diene polymers having unsaturated double bonds in their molecular structure.

2. Description of the Prior Art

A great variety of water-soluble polymers have been known hitherto. The water-soluble polymers include, for example, water-soluble, naturally occurring polymers such as sugar, polysaccharide, and chemically-modified derivatives thereof, for example, alginic acid (sodium alginate), carboxymethyl cellulose (CMC), and methyl cellulose (MC), methyl etherified cellulose (degree of etherification: 25% to 32%); water-soluble polysaccharides produced under the action of microorganisms such as pluran, dextran, and xanthangum; and water-soluble synthetic polymers such as polyvinyl alcohol, polyethylene oxide, sodium polyacrylate, and polyacrylamide.

The above-mentioned water-soluble polymers are used in various fields of industry, utilizing the characteristic properties thereof. For example, these water-soluble polymers are used in large quantities in various fields of the chemical and textile industries, for items such as adhesives, paints, fiber processing agents, sizing agents, binders for making Japanese paper and paperboard, emulsifying agents, coagulating agents, agents for reducing the frictional resistance of a liquid, thickening agents, asphalt-emulsifying agents, spreading agents for agricultural chemicals, pigment dispersants, latex thickeners, soil conditioners, and printing agents, as well as in various fields of bioindustry, such as additives for ice cream, feed processing agents, medicines, cosmetics, stabilizers for sustaining froth on beer, diet foods, medicine tablet-forming agents, and serum-filling agents.

In Japan, the amount of water-soluble polymer used in these fields totals several tens of tons per year, and demands for water-soluble polymers having unique characteristics are increasing.

On the other hand, attempts have been made to render diene polymers containing unsaturated double bonds hydrophilic, so as to provide an electrodeposition resinous paint.

Diene polymers, of which polybutadiene is typical, are essentially insoluble in solvents having a high polarity; for example, water and alcohols. If these polymers could be modified to be water and/or alcoholsoluble, they would be able to be utilized in various ways.

In order to render the diene polymers water-soluble, a great variety of methods have been reported, which are classified as follows.

(1) A method wherein polybutadiene is modified with maleic acid or anhydride and, optionally, the resultant modified product is subjected to further modification, so as to increase the degree of water-solubility of the modified polybutadiene. This method is disclosed in Japanese Examined Patent Publication (Kokoku) No. 46-954 and Japanese Unexamined Patent Publication (Kokai) No. 55-120,604.

(2) A method wherein butadiene is copolymerized with other vinyl monomers, or butadiene monomers is modified and the resultant butadiene derivative monomer is polymerized, to prepare a hydrophilic butadiene polymer. These methods are disclosed in Japanese Unexamined Patent Publication (Kokai) No. 52-102,812 and German Unexamined Patent Publication No. 2,817,227.

(3) A method wherein polybutadiene is epoxidized and the resultant oxirane rings contained in the epoxidized polybutadiene are opened with carboxylic acids, secondary amines, or diamines, to provide a hydrophilic butadiene polymer. The method is disclosed in Japanese Examined Patent Publication (Kokoku) Nos. 44-26,671 and 47-25,131.

(4) A method for chemically modifying polybutadiene with a modifying agent other than those mentioned above, for example, the addition of a sulfonic acid group to the polymer. This method is disclosed in Japanese Unexamined Patent Publication (Kokai) Nos. 55-75,457 and 57-74,308.

The references relating to the above-mentioned methods describe that the polymers obtained by the above-mentioned conventional methods are water-soluble or can be diluted with water. However, most of these polymers are merely capable of being emulsified with water to form a latex and are not really water-soluble. Otherwise they can be diluted with water only in the presence of a large amount of organic solvents compatible with water, such as cellosolves. Thus, of these polymers, few are truly water-soluble.

Furthermore, in the above-mentioned conventional methods, most of the base polybutadienes to be chemically modified are those having a low molecular weight of less than 10,000 (liquid polybutadiene). Polymers having a high molecular weight of 10,000 or more are little used.

The inventors of the present invention made extensive studies in an attempt to provide water-soluble diene polymers having unsaturated double bonds and a high molecular weight. As a result, the inventors of the present invention discovered that when rubber polymers, for example, 1,4-polybutadiene, or crystalline 1,2-polybutadienes having a high molecular weight are subjected to epoxidization so as to epoxidize the unsaturated double bonds contained therein to a specific degree of epoxidization and the resultant epoxidized products are heated in the presence of tertiary amines and carboxylic acids so as to ring-open the epoxidized polymers, the resultant polymers exhibit satisfactory hydrophilicity. The inventors of the present invention also discovered that when the epoxidization is carried out with a carboxylic acid and a peroxide compound and the carboxylic acid used in the epoxidization reaction is the same as that used in the ring-opening reaction of the epoxy rings, the combination of these reactions becomes smooth, and, thus, the production process efficiency can be remarkably improved. The present invention was attained based on the above-mentioned discovery.

SUMMARY OF THE INVENTION

An object of the present invention is to provide a process for producing hydrophilic polymers having double bonds in the molecular structure thereof in an improved productivity.

Another object of the present invention is to provide a process for producing polymers having double bonds in the molecular structure and exhibiting an enhanced hydrophilic property.

The above-mentioned objects are attained by the process of the present invention which comprises the steps of: epoxidizing a diene polymer material consisting of at least one member selected from the group consisting of rubber polymers which have a molecular weight of 10,000 or more and contain a 1,4-addition structure in a molar content of 85% or more based on the entire molar amount of double bonds contained therein, and crystalline 1,2-polybutadiene polymers which have a melting point of from 60° C. to 170° C., and a reduced viscosity ($\eta$sp/c) of 0.2 or more determined in a tetrahydronaphthalene solution in a concentration of 200 mg/100 ml at a temperature of 100° C., and contain a 1,2-addition structure in a molar content of 75% or more based on the entire molar amount of double bonds contained therein to an extent such that the degree of epoxidization of the rubber polymers is in the range of from 5% to 60% and the degree of epoxidization of the crystalline 1,2-polybutadiene is in the range of from 5% to 45%; and ring-opening at least a portion of the epoxy rings in the resultant epoxidized polymeric material by heating it in the presence of a tertiary amine and carboxylic acid.

DESCRIPTION OF THE PREFERRED EMBODIMENTS

The process of the present invention comprises the step of epoxidizing a diene polymer material and a step of ring-opening at least a portion of the resultant epoxy rings in the epoxidized diene polymer material in the presence of a tertiary amine and a carboxylic acid at an elevated temperature.

The diene polymer material consists of at least one member selected from the group consisting of rubber polymers which have a large molecular weight of 10,000 or more and contain a 1,4-addition structure (which is a mixture or either one of the cis- and trans-1,4-structures) in a molar content of 85% or more based on the molar amount of the entire double bonds contained in the rubber polymers, and crystalline 1,2-polybutadiene polymers, preferably crystalline syndiotactic 1,2-polybutadiene polymers which have a melting point of from 60° C. to 170° C. and a reduced viscosity ($\eta$sp/c) of at least 0.2, preferably from 0.5 to 2.0, determined in a tetrahydronaphthalene solution in a concentration of 200 mg/100 ml at a temperature of 100° C., and which contain a 1,2-addition structure in a molar content of at least 75% based on the molar amount of the entire double bonds contained in the polybutadiene polymers.

The rubber polymers usable for the present invention are preferably selected from the group consisting of natural rubber and synthetic rubber polymers, for example, 1,4-polybutadiene polymers, polyisoprene polymers, styrene-butadiene copolymers, and acrylonitrilebutadiene copolymers. Usually, the natural rubber consists essentially of polyisoprene having a high molecular weight and containing a 98 molar % or more 1,4-addition structure.

Rubber polymers having a molecular weight of less than 10,000 are usually in a liquid state and are useless for the process of the present invention.

Also, rubber polymers having a molar content of a 1,4-addition structure of less than 85% do not exhibit rubbery properties.

The 1,2-polybutadiene polymers having a molar content of the 1,2-addition structure of less than 75% exhibit poor crystallinity and are useless for the process of the present invention. Also, a 1,2-polybutadiene polymer having a melting point more than 170° C. exhibits poor solubility in an epoxidization reaction medium at the epoxidizing reaction temperature and, therefore, is useless for the process of the present invention.

The 1,2-polybutadiene polymers having a melting point of less than 60° C. have a poor crystallinity and are useless for the process of the present invention.

Furthermore, if the reduced viscosity is less than 0.2, the 1,2-polybutadiene polymer is usually in the a liquid state and is useless for the process of the present invention.

The crystalline 1,2-polybutadiene polymers usable for the process of the present invention can be produced by the methods disclosed, for example, in Japanese Examined Patent Publication (Kokoku) Nos. 47-19893, 56-18005, 54-5436, 56-18128, 56-18129, 56-18130, and 53-39917.

In the epoxidizing procedures in the process of the present invention, the diene polymer material is epoxidized with an epoxidizing agent preferably consisting of carboxylic peracid or a combination of a carboxylic acid with a peroxide compound at a predetermined temperature.

The carboxylic peracid is produced by the reaction of a corresponding carboxylic acid with a peroxide compound such as hydrogen peroxide. Therefore, the epoxidization reaction can be effected in the presence of a carboxylic peracid or a combination of a carboxylic acid with a peroxide compound, which react with each other in the epoxidizing reaction mixture to produce the corresponding carboxylic peracid.

The carboxylic acid is not limited to a specific type of carboxylic acid as long as it is provided with one or more carboxyl radicals and is capable of being converted to a corresponding peracid. However, it is preferable that the carboxylic acid be selected from saturated and unsaturated carboxylic acids having 1 to 10 carbon atoms, more preferably from saturated aliphatic carboxylic acids, still more preferably from saturated aliphatic monocarboxylic acids.

That is, the carboxylic acid usable for the process of the present invention is preferably selected from aliphatic monocarboxylic acids, for example, formic acid, acetic acid, propionic acid, n-butyric acid, iso-butyric acid, valeric acid, and caproic acid; aliphatic hydroxycarboxylic acids, for example, glycollic acid, lactic acid, hydroacrylic acid, 3-hydroxybutyric acid, glyceric acid, and gluconic acid; aliphatic halogenocarboxylic acids, for example, fluoroacetic acid, chloroacetic acid, chloropropionic acid, chlorobutyric acid, trichlorobutyric acid, and trichloroacetic acid; aldehydecarboxylic acid, for example, glyoxalic acid; keto-carboxylic acid, for example, pyruvic acid, acetoacetic acid, and levulinic acid; aromatic carboxylic acids, for example, benzoic acid, substituted benzoic acid derivatives such as p-toluic acid, m-chlorobenzoic acid, salicylic acid, m-hydroxybenzoic acid, and p-hydroxybenzoic acid, and gallic acid, mandelic acid, and phenylacetic acid; polybasic carboxylic acids, for example, malonic acid, succinic acid, tartaric acid, malic acid, phthalic acids, and citric acid.

The peroxide compound usable for the epoxidizing procedures is preferably hydrogen peroxide.

In the epoxidizing procedures, a predetermined amount of the diene polymer material is dissolved in an inert organic medium, the resultant solution is mixed with necessary amounts of the carboxylic acid and the peroxide compound; and the resultant reaction mixture is subjected to an epoxidizing reaction of the diene polymer material.

The epoxidizing reaction is carried out in accordance with the following chemical equations (1) and (2) or (3):

$$RCOOH + H_2O_2 \rightleftharpoons RCOOOH + H_2O \quad (1)$$

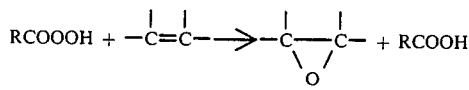
(2)

or

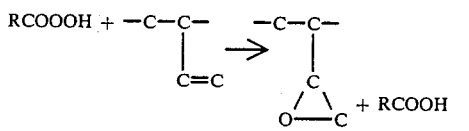
(3)

That is, in accordance with equation (1), the carboxylic acid (RCOOH) is converted to the corresponding peracid (RCOOOH). The peracid reacts with the double bond portions in the diene polymer molecules in accordance with equation (2) or (3) so as to epoxidize the double bond portions. In this reaction of equation (2) or (3), the peracid is converted to the original carboxylic acid.

The epoxidizing reaction is carried out in an inert organic medium which is capable of dissolving the diene polymer material therein, is insoluble or has very poor solubility in water, and is non-reactive to the peroxide compounds, for example, hydrogen peroxide, or the peracids. Usually, the inert organic medium consists of at least one member selected from the group consisting of hydrocarbons, for example, benzene, toluene, xylene, and cyclohexane and halogenated hydrocarbons, for example, chloroform, tetrachloromethane, and chlorobenzenes.

A mixture of a hydrocarbon with a tertiary amine is not adequate as a reaction medium for the epoxidizing reaction when the peroxide compound is used in the form of an aqueous solution, for example, hydrogen peroxide aqueous solution, because the hydrocarbon-tertiary amine mixture causes the reaction mixture to be divided into two phases.

The solution of the diene polymer material is prepared, for example, by mixing the diene polymer material with the inert reaction medium and by stirring the resultant mixture at a temperature of from 0° C. to 80° C., preferably, from 20° C. to 60° C., for one minute to one hour to provide a solution of the diene polymer material. Otherwise, the diene polymer material solution in the inert reaction medium can be prepared by mixing a polymerization mixture containing the diene polymer material, for example, polybutadiene, dissolved in an inert medium, with a polymerization-short stopper, for example, water or hydrochloric acid, and by removing ash from the polymerization mixture by means of water-washing.

There is no limitation to the concentration of the inert reaction medium in the epoxidizing reaction mixture. Usually, the concentration of the inert reaction medium is preferably 1% by weight or more, more preferably 2% to 30% by weight.

In the epoxidizing reaction mixture, the carboxylic acid is preferably in a content of 0.01 to 5 moles per 100 g of the diene polymer material, and the peroxide compound, for example, hydrogen peroxide, is in a content of 0.1 to 5 moles per 100 g of the diene polymer material. Also, the carboxylic peroxide is preferably used in a content of from 0.1 to 3 moles per 100 g of the diene polymer material. The concentration of the carboxylic peracid or each of the carboxylic acid and the peroxide compound is variable depending on the amount of the diene polymer material in the reaction mixture.

When hydrogen peroxide is used, it is preferable that the hydrogen peroxide be mixed in the form of an aqueous solution with a high concentration of from 20% to 60% by weight into the inert reaction medium.

The combination of carboxylic acid with the peroxide compound or the carboxylic peracid can be mixed with the diene polymer material solution in any manner. For example, the diene polymer material solution is mixed with the carboxylic acid, and the resultant mixture is further mixed with the peroxide compound while the temperature of the mixing system is maintained at the level of from room temperature to 90° C.

The resultant epoxidizing reaction mixture is subjected to an epoxidizing procedure preferably at a temperature of from 5° C. to 90° C., more preferably, from 20° C. to 60° C., for 10 minutes to 10 hours, so as to epoxidize the diene polymer material to an extent such that the degree of epoxidization of the rubber polymer is in the range of from 5 to 60 molar %, preferably, from 15 to 45 molar %, and the degree of epoxidization of the crystalline 1,2-polybutadiene polymers is in the range of from 5 to 45 molar %, preferably, 10 to 35 molar %, based on the entire molar amounts of double bonds in the rubber polymer and the crystalline 1,2-polybutadiene polymer, respectively.

When the reaction temperature is lower than the above-mentioned lower limits, 5° C., sometimes, the epoxidization reaction rate is undesirably low. Also, when the reaction temperature is higher than 90° C., sometimes, the peroxide compound and/or the corresponding peracid is thermally decomposed. This decomposition causes the reaction system to be dangerous.

When the carboxylic acids other than formic acid are used, the resultant corresponding peracid has a smaller content of active oxygen than that of formic peracid derived from formic acid and is safer than formic peracid. Therefore, the reaction mixture containing carboxylic acids other than the formic acid can be subjected to a higher epoxidizing temperature than that of a reaction mixture containing formic acid.

If the diene polymer material is epoxidized over the above-mentioned upper limit of the degree of epoxidization, the resultant epoxidized polymer material is undesirably gelled in the epoxidizing reaction mixture or is undesirably insoluble in the reaction medium for the ring-opening procedure.

If the degree of epoxidization of the resultant epoxidized polymer material is less than the above-mentioned lower limit thereof, the ring-opened final product from the epoxidized polymer material exhibits an unsatisfactory hydrophilic property.

The epoxidizing reaction may be carried out in the presence of a catalyst consisting of a mineral acid, for example, sulfuric acid, or a cation exchange resin. The catalyst is effective for promoting the conversion rate of the carboxylic acid to the corresponding peracid and, therefore, for accelerating the epoxidizing reaction rate of the diene polymer material. However, the catalyst sometimes causes the diene polymer material in the reaction mixture to be gelled. Also, it is difficult to remove the catalyst from the reaction mixture. Therefore, it is preferable that no catalyst be used so as to make the reaction system simple.

The conversion of the carboxylic acid to the corresponding peracid is a velocity controlling step of the epoxidizing reaction of the diene polymer material. When no catalyst is used, strong acid is converted to a corresponding peracid at a high rate and, therefore, is highly effective for promoting the epoxidizing reaction. If the epoxidizing reaction rate is unsatisfactorily low, it is necessary to use a high concentration of hydrogen peroxide aqueous solution, or an increased amount of carboxylic acid, or to elevate the reaction temperature, or to prolong the reaction time, whereby a desired degree of epoxidization is obtained.

In the epoxidizing reaction mixture and/or the ring-opening reaction mixture, it is preferable that a stabilizer for the diene polymer material and/or epoxidized diene polymer material be added in a small amount. The stabilizer is preferably 2,6-di-tert-butyl-p-cresol (BHT).

After the epoxidizing reaction is completed in a desired degree of epoxidization, the resultant epoxidized polymer material is subjected to the ring-opening reaction.

The epoxidized polymer material may be isolated from the epoxidizing reaction mixture and then subjected to the ring-opening reaction. Otherwise, the epoxidizing reaction mixture containing the epoxidized polymer material may be subjected to the ring-opening reaction.

Where the carboxylic acid used in the epoxidizing reaction is the same as that to be used in the ringopening reaction, the epoxidizing reaction mixture containing the epoxidized polymer material is preferably directly subjected to the ring-opening reaction so that the carboxylic acid used in the epoxidizing reaction can be re-used in the ring-opening reaction.

The isolation of the epoxidized polymer material from the epoxidizing reaction mixture can be effected by a known method, for example, by washing the epoxidizing reaction mixture with water at a low temperature of from 5° C. to 60° C., and the washed mixture is mixed into a large amount of a liquid, for example, methyl alcohol which has no or very poor dissolving property to the epoxidized polymer material so that the epoxidized polymer material is precipitated from the mixture.

Where the epoxidizing reaction mixture containing the epoxidized polymer material is directly subjected to the ring-opening reaction, if the mixture contains a residual amount of peroxide compound, it is preferable that the peroxide compound be removed from the mixture by means of water-washing at a low temperature, before the mixture is subjected to the ring-opening reaction.

If the ring-opening reaction mixture contains a certain amount of the residual peroxide compound, sometimes the polymer material in the reaction mixture is gelled.

The ring-opening reaction of the epoxy rings in the epoxidized polymer material is carried out in the presence of a carboxylic acid and a tertiary amine at an elevated temperature of preferably from 40° C. to 160° C., more preferably, from 60° C. to 130° C.

If the ring-opening reaction temperature is less than 40° C., the reaction rate is too low. If the ringopening reaction temperature is more than 160° C., sometimes the polymer material in the reaction mixture is gelled. Usually, the ring-opening reaction is carried out for 10 minutes or more, preferably, 10 minutes to 10 hours.

The tertiary amine is effective for promoting the dissolution of the epoxidized polymer material in the reaction mixture at the ring-opening reaction temperature.

The tertiary amine is preferably selected from the group consisting of (1) heterocyclic tertiary amines including pyridine compounds, for example, pyridine, ethyl pyridine, and 2-chloropyridine, α-, β-, γ-picolines, lutidine compounds, for example, 3,5-lutidine, and 2,4-lutidine, collidine compounds, for example, 2,4,6-collidine, quinoline compounds, isoquinoline compounds, alkylimidazole compounds, for example, N-methyl imidazole, N-alkylcarbazole compounds, for example, N-methylcarbazole, pyrazine compounds, N-alkyl piperidine compouds, for example, N-methyl piperidine and N-ethylpiperidine, N,N'-dialkyl piperidine compounds, for example, N,N'-dimethyl piperidine, and N-alkylmorpholine, for example, N-methylmorpholine; (2) aliphatic tertiary amines, including trialkyl amines for example, triethyl amine, tripropyl amine, tributyl amine, and diethylbutyl amine, and trialkanol amines, for example, triethanol amine, tripropanol amine, and tributanol amine; and (3) aromatic tertiary amines, for example, N,N-dimethylaniline, N,N-diethylaniline, and benzyl-N,N-dimethylamine. In order to obtain the epoxy ring-opened polymer material having a high hydrophilic property, it is preferable that the tertiary amines to be used for the ring-opening step be selected from water-soluble or highly compatible tertiary amines. When the water-soluble or highly compatible tertiary amine is used in the ring-opening step, the resultant hydrophilic polymer is stable in the form of a uniform solution and usually does not deposit from the reaction mixture. Therefore, the ring-opening reaction can be carried out smoothly and uniformly.

Also, the use of a certain type of tertiary amines in which a steric hindrance of atoms and/or radicals located around a nitrogen atom in the tertiary amines is small is preferable, because in this type of tertiary amines, the reactivity of the nitrogen atom with the epoxide rings is high and the resultant products exhibit a high hydrophilic property. The highly reactive tertiary amines are preferably selected from pyridine, picoline, lutidine, quinoline, isoquinoline, alkylimidazol, and pyrazine compounds.

The ring-opening procedures are carried out as follows.

Where the resultant reaction mixture from the epoxidizing step is directly subjected to the ringopening reaction without isolating the epoxidized polymer material, a tertiary amine or a solution of a tertiary amine in a reaction medium is mixed into the reaction mixture, then a carboxylic acid which may be the same as that used in the epoxidizing reaction is added to the reaction mixture. The resultant reaction mixture is heated at a temperature of 40° C. to 160° C. while the mixture is stirred.

The reaction medium for the ring-opening reaction is preferably selected from hydrocarbons and halogenated hydrocarbons. It is preferable that the reaction medium for the ring-opening reaction be the same as that used for the epoxidizing reaction.

Where the resultant epoxidized polymer material is isolated from the epoxidizing reaction mixture, the epoxidized polymer material is dissolved in a tertiary amine or a solution of a tertiary amine in a reaction medium, and the resultant solution is mixed with a carboxylic acid. The resultant reaction mixture is subjected to a ring-opening reaction under the same conditions as those mentioned above.

When the ring-opening reaction mixture contains a certain amount of water and/or methyl alcohol, it is preferable that the water and/or methyl alcohol be removed from the reaction mixture by means of distillation.

The epoxy ring-opening procedure is preferably carried out to an extent such that the epoxy rings in a molar amount of 5% to 60% based on the entire molar amount of the double bonds contained in the rubber polymers and the epoxy rings in a molar amount of 5% to 45% based on the entire molar amount of the double bonds in the 1,2-polybutadiene polymers are ring-opened.

The amount of residual epoxy rings in the ringopened polymer material can be measured by means of $^1$H-NMR. That is, a ring-opened polymer material to be tested is dissolved in heavy water ($D_2O$) or heavy methyl alcohol ($CD_3OD$), and the solution is subjected to $^1$H-NMR measurement to determine the amount of epoxide protons

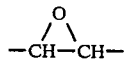

in the ring-opened polymer material.

The degree of the ring-opening can be calculated from the difference in the amount of epoxide protons between the epoxidized polymer material and the ringopened polymer material.

The resultant ring-opened polymer material is isolated from the reaction mixture and refined as follows.

For example, after the ring-opening reaction is completed, the resultant reaction mixture is mixed into a large amount of n-hexane, which is a bad solvent for the ring-opened polymer material, or is cooled to room temperature or lower so as to cause the ring-opened polymer material to deposit from the reaction mixture. If the concentration of the ring-opened polymer material is too low and the ring-opened polymer material is not deposited by the above-mentioned operation, the reaction mixture is concentrated by means of distillation and is then mixed into a large amount of n-hexane.

Next, the deposited ring-opened polymer material, which is hydrophilic, is separated from the reaction mixture by removing (distilling) the reaction medium under a reduced pressure at room or an elevated temperature.

The isolated ring-opened polymer material is refined from the residual tertiary amine and carboxylic acid, which are highly compatible with the ring-opened polymer material, by dissolving it in hot isopropyl alcohol, by causing the ring-opened polymer material to be redeposited from the solution by adding n-hexane into the solution, and, finally, by drying it.

A ring-opened polymer material containing a small amount of the reaction medium is usable in various fields, for example, for the production of paint.

The resultant hydrophilic polymer material produced in accordance with the process of the present invention has rubber-like properties and is soluble in all or either one of water, methyl alcohol, and ethyl alcohol at room temperature, in tertiary amines, for example, pyridine at room temperature or an elevated temperature, or in alcohol compounds such as n-propyl alcohol, isopropyl alcohol, isobutyl alcohol, tert-butyl alcohol, isoamyl alcohol, diethylene glycol, and benzyl alcohol.

The hydrophilic polymer material of the present invention is insoluble in solvents having a poor or mild hydrogen bond-forming property, for example, aliphatic, aromatic and/or heterocyclic hydrocarbons such as benzene, toluene, xylene, n-hexane, aliphatic $C_6$ hydrocarbon mixture solvents, n-heptane, petroleum ether (mineral spirit), naphtha, and cyclohexane; halogenated hydrocarbons, for example, chloroform and chlorobenzene; and aliphatic ether and ketone compounds, for example, diethylether, methylisopropylketone, and acetone.

In the process of the present invention, when the carboxylic acid used in the epoxidizing step is the same as that used in the ring-opening step, the combination of the epoxidizing step and the ring-opening step can be carried out smoothly and, therefore, the process can be carried out easily.

The resultant polymer material from the process of the present invention is a hydrophilic (sometimes, water-soluble) polymer material having a high molecular weight and containing unsaturated double bonds and is useful for various purposes, for example, for water-soluble adhesives, water-soluble paints, water-absorbing materials, moisture-absorbing adhesives, electrode-positing paints, and anti-static agents, water absorbing agents, moisture-absorbing agents, and thickness agents for fibers and paper.

Also, the hydrophilic polymer material exhibits specific features, for example, photosensitivity, rubber-like property, and cross-linking property at an elevated temperature (thermo-setting property).

EXAMPLES

The specific examples presented below will serve to more fully elaborate how the process of the present invention is practiced. However, it should be understood that these examples are only illustrative and in no way limit the present invention.

In the examples, the following measurements were carried out.

1. The microstructures of rubber polymers and crystalline 1,2-polybutadiene polymers were determined by means of infrared spectral analysis (IR) and/or nuclear magnetic resonance spectral analysis.

2. The melting points of the crystalline 1,2-polybutadiene polymer were represented by peak points of endothermic curves prepared by an autographic differential scanning calorimeter (DSC).

3. The degree of epoxidization of the diene polymer materials was determined in such a manner that the polymer material to be tested was dissolved in heavy chloroform and the molar amount of the epoxide rings in the polymer material was determined by subjecting the solution to the nuclear magnetic resonance analysis based on the entire molar amount of double bonds in the polymer material.

4. The molecular structure of the ring-opened polymer materials was determined in such a manner that the polymer material to be tested was dissolved in heavy methyl alcohol or heavy water and the resultant solution was subjected to a $^1$H-NMR analysis.

5. The solubility of a polymer material in a solvent was measured by mixing 0.1 g of a polymer material into 5 ml of a solvent in a test tube and by leaving the mixture to stand at room temperature for about 12 hours.

EXAMPLES 1 TO 6

Epoxidization

In each of Examples 1 to 6, a four-necked flask having a capacity of 300 ml and equipped with a stirrer, a thermometer, a dropping funnel, and a reflux condenser was charged with 150 ml of toluene, and then with 10.82 g (0.2 mole of monomer units) of cis-1,4-polybutadiene (manufactured by Ube Industries, Ltd., and available under the trademark UBEPOL #150) having a 97.4 molar % of cis-1,4-addition structure, a 1.3 molar % of trans-1,4-addition structure, an intrinsic viscosity [$\eta$] of 2.1, and a number average molecular weight of about 200,000. The mixture was stirred at a temperature of 45° C. for 100 minutes to provide a polymer solution.

While the temperature of the polymer solution was maintained at 45° C., 2.02 g (0.044 mole) of formic acid was mixed with the polymer solution, and then 48 g of 30% by weight aqueous solution of hydrogen peroxide (0.42 mole of hydrogen peroxide) was added dropwise to the polymer solution over 20 minutes.

The resultant epoxidizing reaction solution was stirred at a temperature of 45° C. for 5 hours to epoxidize the 1,4-polybutadiene polymer.

The resultant reaction solution was washed with water and then mixed with 1000 ml of methyl alcohol to allow the resultant epoxidized polybutadiene to deposit. The deposited epoxidized polymer was isolated from the reaction solution.

A small portion of the isolated epoxidized polymer was refined by dissolving it in tetrahydrofuran (THF), and then by adding methyl alcohol to the solution so as to cause the epoxidized polymer to deposit from the solution by separating the deposited epoxidized polymer, and finally, by drying it at room temperature under a reduced pressure for 2 days. The above-mentioned refining procedures were carried out for the purpose of determining the degree of epoxidation of the polymer, which should be completely free from impurities, while the refining procedures were not always necessary for the ring-opening step.

As a result of the NMR analysis, the degree of epoxidization of the resultant epoxidized 1,4-polybutadiene was 31 molar %.

Epoxide ring-opening

The remaining portion of the isolated epoxidized polymer in a dry weight of 6 g was dissolved in 150 ml of pyridine. The solution was heated to a temperature of 90° C. while stirring, the hot solution was mixed with 0.1 mole of the carboxylic acid indicated in Table 1, and the resultant reaction mixture was heated at the above-mentioned temperature for 5 hours.

The reaction mixture was cooled to room temperature and was mixed into 500 ml of n-hexane so as to allow the resultant ring-opened polymer to deposit from the mixture.

The deposited polymer was isolated from the mixture, was dissolved in isopropyl alcohol, was deposited with n-hexane from the solution, and finally, was dried at room temperature under a reduced pressure for 2 days, for the purpose of refining.

The resultant refined ring-opened polymer was subjected to the $^1$H-NMR analysis. It was confirmed that the resultant polymer was completely free from epoxide (epoxy methine) protons.

The solubilities of the resultant hydrophilic polymer and the non-modified 1,4-polybutadiene in various solvents are shown in Table 1.

EXAMPLES 7 TO 11

In each of Examples 7 to 11, the same epoxidizing procedures as those described in Example 1 were carried out with the following exception. That is, formic acid was used in an amount of 0.066 mole and hydrogen peroxide in the form of a 30% by weight aqueous solution was used in an amount of 0.66 mole.

The degree of epoxidization of the epoxidized 1,4-polybutadiene was 51 molar %.

The resultant epoxidizing polymer was subjected to the same ring-opening procedures as those described in Example 1, except that the carboxylic acid used was that indicated in Table 1.

All the resultant hydrophilic polymers in Examples 7 to 11 were found to be completely free from epoxy methine protons through the $^1$H-NMR analysis.

TABLE 1

| Example No. | Degree of epoxidization of epoxidized polymer (molar %) | Type of carboxylic acid used in ring-opening step | Degree of solubility of resultant hydrophilic polymer in various solvents | | | | | | | |
|---|---|---|---|---|---|---|---|---|---|---|
| | | | Water | Methyl alcohol | Ethyl alcohol | Diethyl ether | Acetone | n-Hexane | Benzene | Xylene |
| 1 | 31 | Acetic acid | 1 | 1 | 1 | 2 | 3 | 3 | 3 | 3 |
| 2 | " | Propionic acid | 2 | 1 | 1 | 3 | 3 | 3 | 3 | 3 |
| 3 | " | Lactic acid | 1 | 1 | 2 | 2 | 2 | 3 | 3 | 3 |
| 4 | " | Glycollic acid | 2 | 1 | 1 | 3 | 3 | 3 | 3 | 3 |
| 5 | " | Gluconic acid | 2 | 1 | 2 | 3 | 3 | 3 | 3 | 3 |
| 6 | " | Benzoic acid | 2 | 1 | 2 | 3 | 3 | 3 | 3 | 3 |
| 7 | 51 | Acetic acid | 1 | 1 | 1 | 3 | 2 | 3 | 3 | 3 |
| 8 | " | Propionic acid | 1 | 1 | 1 | 3 | 3 | 3 | 3 | 3 |
| 9 | " | Lactic acid | 1 | 1 | 1 | 3 | 2 | 3 | 3 | 3 |
| 10 | " | Glycollic acid | 1 | 1 | 1 | 3 | 3 | 3 | 3 | 3 |
| 11 | " | Benzoic acid | 1 | 1 | 1 | 3 | 3 | 3 | 3 | 3 |
| Control (non-modified cis-1,4- | — | — | 3 | 3 | 3 | 1 | 3 | 1 | 1 | 1 |

TABLE 1-continued

| Example No. | Degree of epoxidization of epoxidized polymer (molar %) | Type of carboxylic acid used in ring-opening step | Degree of solubility of resultant hydrophilic polymer in various solvents | | | | | | | |
|---|---|---|---|---|---|---|---|---|---|---|
| | | | Water | Methyl alcohol | Ethyl alcohol | Diethyl ether | Acetone | n-Hexane | Benzene | Xylene |
| polybutadiene) | | | | | | | | | | |

Note:
Degree of Solubility:
1: Completely soluble,
2: Swelling or partially soluble,
3: Insoluble

EXAMPLES 12 TO 16

In each of Examples 12 to 16, the same procedures as those described in Example 1 were carried out except that the cis-1,4-polybutadiene was replaced by low cis-1,4-polybutadiene which contained a 38.1 molar % cis-1,4-addition structure, a 52.2 molar % trans-1,4-addition structure, a 9.7 molar % vinyl structure and an intrinsic viscosity [η] of 2.0, had a number average molecular weight of about 150,000 and a weight average molecular weight of about 400,000 (manufactured by Asahi Kasei Kogyo and available under the trademark Diene 35R); in the epoxidizing step, formic acid was used in an amount of 0.088 mole, hydrogen peroxide in the form of a 30 weight % aqueous solution was used in an amount of 0.42 mole, and the resultant epoxidized polymer had a degree of epoxidization of 29 molar %; and in the ringopening step, the carboxylic acid used was of the type indicated in Table 2.

In all of Examples 12 to 16, it was confirmed by means of $^1$H-NMR analysis that the resultant hydrophilic polymers are completely free from the epoxy methine protons.

The solubilities of the resultant hydrophilic polymers in various solvents are shown in Table 2.

EXAMPLES 20 TO 23

In each of Examples 20 to 23, the same procedures as those described in Example 1 were carried out except that in the ring-opening step, the pyridine was replaced by 150 ml of α-picoline in Examples 20 and 21 and by 150 ml of isoquinoline in Examples 22 and 23; and the carboxylic acid used was of the type indicated in Table 3.

In the results of the $^1$H-NMR analysis, it was found that all the resultant hydrophilic polymers in Examples 20 to 23 are completely free from the epoxy methine protons.

The solubilities of the resultant hydrophilic polymers in various solvents are shown in Table 3.

COMPARATIVE EXAMPLE 1

The same procedures as those described in Example 1 were carried out except that in the ring-opening step, no carboxylic acid was added to the reaction mixture.

After the comparative ring-opening step was completed, it was found by the NMR analysis that the epoxidized polymer was not ring-opened.

The solubilities of the comparative polymer in various solvents are shown in Table 3.

TABLE 2

| Example No. | Degree of epoxidization of epoxidized polymer (molar %) | Type of carboxylic acid used in ring-opening step | Solubility of resultant hydrophilic polymer in various solvents | | | | | |
|---|---|---|---|---|---|---|---|---|
| | | | Water | Methyl alcohol | Ethyl alcohol | Acetone | Benzene | Xylene |
| 12 | 29 | Acetic acid | 1 | 1 | 1 | 2 | 3 | 3 |
| 13 | " | Propionic acid | 2 | 1 | 1 | 3 | 3 | 3 |
| 14 | " | Lactic acid | 1 | 1 | 1 | 2 | 3 | 3 |
| 15 | " | Glycollic acid | 2 | 1 | 1 | 3 | 3 | 3 |
| 16 | " | Benzoic acid | 2 | 1 | 1 | 3 | 3 | 3 |
| Control non-modified trans-1,4-polybutadiene | — | — | 3 | 3 | 3 | 3 | 1 | 1 |

EXAMPLES 17 TO 19

In each of Examples 17 to 19, the same procedures as those described in Example 1 were carried out except that the combination of formic acid with hydrogen peroxide was replaced by 0.09 mole of m-chlorobenzoic peracid available in the purity of about 80%; the epoxidizing reaction was carried out at a temperature of 30° C.; the resultant epoxidized polymer had a degree of epoxidization of 32 molar %; and in the ring-opening step, the carboxylic acid used was of the type indicated in Table 3.

EXAMPLE 24

The same procedures as those described in Example 1 were carried out except that in the ring-opening step, the acetic acid was replaced by lactic acid, and the ring-opening reaction was carried out at a temperature of 90° C. for one hour.

As a result of the $^1$H-NMR analysis, it was found that the resultant hydrophilic polymer had about 8 molar % of an epoxy structure. That is, about 23 molar % of the epoxy structure was ring-opened.

The solubilities of the product in various solvents are shown in Table 3.

EXAMPLE 25

The same procedures as those described in Example 1 were carried out except that, in the epoxidizing step, the cis-1,4-polybutadiene was used in an amount of 5.04 g, the formic acid and the hydrogen peroxide were used in amounts of 0.022 mole and 0.22 mole, respectively, and the resultant reaction mixture from the epoxidizing step was washed with water and was then directly subjected to the ring-opening step without isolating the epoxidized polymer; and, in the ring-opening step, 75 ml of pyridine and 0.1 mole of acetic acid were added to the reaction mixture, and the ring-opening reaction was carried out at a temperature of 100° C. for 7 hours while the reaction mixture was stirred.

As a result of the $^1$H-NMR analysis, it was found that the resultant hydrophilic polymer contained no epoxy methine protons.

The solubilities of the product in various solvents are shown in Table 3.

the temperature of the mixture was maintained at 40° C. The resultant epoxidizing reaction mixture was stirred at a temperature of 40° C. for 7 hours to epoxidize the syndiotactic 1,2-polybutadiene.

Thereafter, the reaction mixture was washed with water and then mixed into 10 l of methyl alcohol to cause the epoxidized polymer to deposit from the mixture. The deposited polymer was isolated from the mixture and then refined by dissolving it in tetrahydrofuran, by depositing it from the solution with methyl alcohol, by isolating the deposit, and finally, by drying the isolated deposit at a temperature of 20° C. under a reduced pressure for 2 days.

As a result of the NMR analysis, it was found that the degree of epoxidization of the resultant epoxidized polymer was 25 molar %.

Ring-Opening Step

In a four-necked flask having a capacity of 300 ml and equipped with a stirrer, a thermometer, a dropping

TABLE 3

| Example No. | Degree of epoxidization of epoxidized polymer (molar %) | Type of carboxylic acid used in ring-opening step | Solubility of resultant hydrophilic polymer in various solvents | | | | | |
|---|---|---|---|---|---|---|---|---|
| | | | Water | Methyl alcohol | Ethyl alcohol | Acetone | Benzene | Xylene |
| Example | | | | | | | | |
| 17 | 32 | Acetic acid | 1 | 1 | 1 | 3 | 3 | 3 |
| 18 | " | Lactic acid | 1 | 1 | 1 | 3 | 3 | 3 |
| 19 | " | Glycollic acid | 2 | 1 | 1 | 3 | 3 | 3 |
| 20 | 31 | Acetic acid | 1 | 1 | 1 | 3 | 3 | 3 |
| 21 | " | Lactic acid | 1 | 1 | 1 | 3 | 3 | 3 |
| 22 | " | Acetic acid | 1 | 1 | 1 | 3 | 3 | 3 |
| 23 | " | Lactic acid | 1 | 1 | 1 | 3 | 3 | 3 |
| 24 | " | " | 1 | 1 | 1 | 3 | 3 | 3 |
| 25 | " | Acetic acid | 1 | 1 | 1 | 3 | 3 | 3 |
| Comparative Example 1 | " | None | 3 | 3 | 3 | 3 | 1 | 1 |

EXAMPLES 26 TO 31

Epoxidizing Step

In each of Examples 26 to 31, a four-necked flask having a capacity of 10 l and equipped with a stirrer, a thermometer, a dropping funnel, and a reflux condenser was charged with 5 l of chloroform and then with 250 g (4.62 moles of monomer units) of a high molecular weight syndiotactic-1,2-polybutadiene which contained 86 molar % of 1,2-addition structure and had a melting point of 139° C. and a reduced viscosity of 1.19 determined in a tetrahydronaphthalene solution in a concentration of 200 mg/100 ml at a temperature of 100° C. The mixture in the flask was stirred at a temperature of 40° C. for 2 hours to provide a polymer solution. The polymer solution was mixed with 140 g (3.04 moles) of formic acid at a temperature of 40° C., and then 261 g of a 30 weight % hydrogen peroxide aqueous solution (corresponding to 2.3 moles of hydrogen peroxide) was added dropwise to the mixture over 30 minutes while funnel, and a reflux condenser, 6 g of the refined epoxidized polymer was dissolved in 150 ml of pyridine, the resultant solution was heated to a temperature of 90° C. and mixed with 0.1 mole of the carboxylic acid as indicated in Table 4, and the resultant ring-opening reaction mixture was stirred at a temperature of 90° C. for 5 hours.

Thereafter, the reaction mixture was mixed into 500 ml of n-hexane to allow the resultant ring-opened polymer to deposit.

The deposit was collected from the mixture and then refined by dissolving in isopropyl alcohol (IPA), by depositing with n-hexane, and finally, by drying at room temperature under a reduced pressure for 2 days.

As a result of the $^1$H-NMR analysis, it was found that the resultant polymer contained no epoxy methine and methylene protons.

The solubilities of the resultant ring-opened polymer and the non-modified syndiotactic 1,2-polybutadiene in various solvents are shown in Table 4.

TABLE 4

| Example No. | Degree of epoxidization of epoxidized polymer (molar %) | Type of carboxylic acid used in ring-opening step | Solubility of resultant hydrophilic polymer in various solvents | | | | | | | |
|---|---|---|---|---|---|---|---|---|---|---|
| | | | Water | Methyl alcohol | Ethyl alcohol | Diethyl ether | Acetone | n-Hexane | Benzene | Xylene |
| 26 | 25 | Acetic acid | 1 | 1 | 1 | 3 | 2 | 3 | 3 | 3 |
| 27 | " | Propionic acid | 1 | 1 | 1 | 3 | 3 | 3 | 3 | 3 |

TABLE 4-continued

| Example No. | Degree of epoxidization of epoxidized polymer (molar %) | Type of carboxylic acid used in ring-opening step | Solubility of resultant hydrophilic polymer in various solvents | | | | | | | |
|---|---|---|---|---|---|---|---|---|---|---|
| | | | Water | Methyl alcohol | Ethyl alcohol | Diethyl ether | Acetone | n-Hexane | Benzene | Xylene |
| 28 | " | Lactic acid | 1 | 1 | 1 | 3 | 2 | 3 | 3 | 3 |
| 29 | " | Glycollic acid | 1 | 1 | 1 | 3 | 3 | 3 | 3 | 3 |
| 30 | " | Gluconic acid | 2 | 1 | 1 | 3 | 3 | 3 | 3 | 3 |
| 31 | " | Benzoic acid | 2 | 1 | 1 | 3 | 2 | 3 | 3 | 3 |
| Control (non-modified 1,2-polybutadiene) | — | — | 3 | 3 | 3 | 2-3 | 3 | 2-3 | 1 | 1 |

EXAMPLES 32 TO 40

In Examples 32 to 40, the same procedures as those described in Example 26 were applied to a high molecular weight crystalline 1,2-polybutadiene (manufactured by Japan Synthetic Rubber Co., Ltd.) having a 92 molar % 1,2-addition structure, a melting point of 80° C., and a reduced viscosity of 1.4, in Examples 32 to 35, to a high molecular weight crystalline 1,2-polybutadiene having an 81 molar % 1,2-addition structure, a melting point of 114° C., and a reduced viscosity of 1.1 in Examples 36 to 38, and to a high molecular weight crystalline 1,2-polybutadiene (manufactured by Ube Industries, Ltd.) having 87 molar % of a 1,2-addition structure, a melting point of 153° C. and a reduced viscosity of 1.2 in Examples 39 and 40.

In each of Examples 32 to 40, in the ring-opening step, the carboxylic acid indicated in Table 5 was used.

The degrees of epoxidization of the resultant epoxidized polymers were respectively 22 molar % in Examples 32 to 35, 27 molar % in Examples 36 to 38, and 21 molar % in Examples 39 and 40.

After the ring-opening procedures were completed, it was confirmed by means of the $^1$H-NMR analysis that all the resultant polymers were completely free from the epoxy methine protons.

The solubilities of the resultant polymers and the corresponding non-modified polymers in various solvents are shown in Table 5.

EXAMPLES 41 TO 43

In each of Examples 41 to 43, the same procedures as those described in Example 26 were carried out except that a flask having a capacity of one liter was used, the combination of formic acid and hydrogen peroxide was replaced by 0.25 mole of m-chlorobenzoic per acid (having a purity of approximately 80%), chloroform was used in an amount of 500 ml, and the syndiotactic 1,2-polybutadiene was used in an amount of 25 g (0.462 mole of monomer units).

The degree of epoxidization of the epoxidized polymer was 21 molar %.

In the ring-opening step, the carboxylic acid used was of the type indicated in Table 5.

As a result of the $^1$H-NMR analysis, it was found that the resultant ring-opened polymer was completely free from epoxy methine and methylene protons.

The solubilities of the resultant polymers in various solvents are shown in Table 5.

TABLE 5

| Example No. | Degree of epoxidization of epoxidized polymer (molar %) | Type of carboxylic acid used in ring-opening step | Solubility of resultant hydrophilic polymer in various solvents | | | | | |
|---|---|---|---|---|---|---|---|---|
| | | | Water | Methyl alcohol | Ethyl alcohol | Acetone | Benzene | Xylene |
| 32 | 22 | Acetic acid | 1 | 1 | 1 | 3 | 3 | 3 |
| 33 | " | Propionic acid | 1 | 1 | 1 | 3 | 3 | 3 |
| 34 | " | Lactic acid | 1 | 1 | 1 | 3 | 3 | 3 |
| 35 | " | Glycollic acid | 1 | 1 | 1 | 3 | 3 | 3 |
| Control non-modified polymer | — | — | 3 | 3 | 3 | 3 | 1 | 1 |
| 36 | 27 | Acetic acid | 1 | 1 | 1 | 3 | 3 | 3 |
| 37 | " | Lactic acid | 1 | 1 | 1 | 3 | 3 | 3 |
| 38 | " | Acetic acid | 1 | 1 | 1 | 3 | 3 | 3 |
| Control non-modified polymer | — | — | 3 | 3 | 3 | 3 | 1 | 1 |
| 39 | 21 | Acetic acid | 1 | 1 | 1 | 3 | 3 | 3 |
| 40 | " | Lactic acid | 1 | 1 | 1 | 3 | 3 | 3 |
| Control non-modified polymer | — | — | 3 | 3 | 3 | 3 | 1 | 1 |
| 41 | 21 | Acetic acid | 1 | 1 | 1 | 3 | 3 | 3 |
| 42 | " | Lactic acid | 1 | 1 | 1 | 3 | 3 | 3 |
| 43 | " | Glucollic acid | 1 | 1 | 1 | 3 | 3 | 3 |

EXAMPLES 44 TO 47

In each of Examples 44 to 47, the same procedures as those described in Example 26 were carried out except that 150 ml of α-picoline was used for pyridine in Examples 44 and 45, 150 ml of isoquinoline was used for pyridine in Examples 46 and 47, and in the ring-opening step, the carboxylic acid indicated in Table 6 was used.

It was found by means of the $^1$H-NMR analysis that all the resultant ring-opened polymers were completely free from epoxy methine and methylene protons.

The solubilities of the resultant polymers in various solvents are shown in Table 6.

COMPARATIVE EXAMPLE 2

The same procedures as those mentioned in Example 26 were carried out except that no carboxylic acid was used in the ring-opening step.

As a result of the $^1$H-NMR analysis, it was found that the degree of the epoxidization of the ring-opened polymer was the same as that of the epoxidized polymer. That is, the absence of the carboxylic acid caused the ring-opening procedures to be ineffective.

The solubilities of the comparative product in various solvents are indicated in Table 6.

EXAMPLE 48

The same procedures as those described in Example 26 were carried out except that the ring-opening reaction was carried out at a temperature of 60° C. for 3 hours.

In the $^1$H-NMR analysis of the resultant ring-opened polymer, it was found that the about 20 molar % of the epoxy rings were opened and about 5 molar % of the epoxy rings were retained in the ring-opened polymer.

The solubilities of the resultant polymer in various solvents are shown in Table 6.

sisting of a solution of the epoxidized polymer in toluene, appeared cloudy white, but did not contain large water drops.

A portion of the epoxidized polymer solution in an amount of 60 ml (containing 0.1 mole of monomer units) was placed in the same type of four-necked flask.

The remaining portion of the epoxidized polymer solution was mixed with 200 ml of methyl alcohol so as to deposit the epoxidized polymer. The deposited epoxidized polymer was collected and was refined by the same method as that mentioned in Example 1.

The refined epoxidized polymer exhibited a degree of epoxidization of 29 molar % determined by the NMR analysis.

The epoxidized polymer solution in the four-necked flask was evenly mixed with 120 ml of pyridine, the mixture was heated to a temperature of 90° C., 6 g (0.1 mole) of acetic acid was added to the heated mixture, and the resultant ring-opening reaction mixture was stirred at a temperature of 90° C. for 5 hours.

The resultant reaction mixture was treated in the same manner as that described in Example 1 to isolate the ring-opened polymer.

As a result of the $^1$H-NMR analysis, it was found that the resultant ring-opened polymer was completely free from the epoxy methine protons.

The solubilities of the resultant polymer and the non-modified polymer in various solvents are shown in Table 7.

EXAMPLE 50

The same procedures as those described in Example

TABLE 6

| Example No. | Degree of epoxidization of epoxidized polymer (molar %) | Type of carboxylic acid used in ring-opening step | Solubility of resultant hydrophilic polymer in various solvents | | | | | |
|---|---|---|---|---|---|---|---|---|
| | | | Water | Methyl alcohol | Ethyl alcohol | Acetone | Benzene | Xylene |
| Example | | | | | | | | |
| 44 | 25 | Acetic acid | 1 | 1 | 1 | 3 | 3 | 3 |
| 45 | " | Lactic acid | 1 | 1 | 1 | 3 | 3 | 3 |
| 46 | " | Acetic acid | 1 | 1 | 1 | 3 | 3 | 3 |
| 47 | " | Lactic acid | 1 | 1 | 1 | 3 | 3 | 3 |
| Comparative Example 2 | " | None | 3 | 3 | 3 | 1 | 1 | 1 |
| Example 48 | " | Acetic acid | 1 | 1 | 1 | 3 | 3 | 3 |

EXAMPLE 49

The same procedures as those described in Example 1 were carried out with the following exception. The epoxidizing reaction mixture was prepared by heating the solution of 10.8 g of the cis-1,4-polybutadiene (UBEPOL #150) in 108 ml of toluene to a temperature of 60° C., mixing it with 12 g (0.2 mole) of acetic acid, and then adding dropwise 22.6 g of a 60 weight % hydrogen peroxide aqueous solution (containing 0.4 mole of hydrogen peroxide) over 20 minutes while maintaining the temperature of the mixture at 60° C. The reaction mixture was stirred at a temperature of 60° C. for 7 hours to epoxidize the cis-1,4-polybutadiene.

Thereafter, the resultant epoxidizing reaction mixture was mixed with 150 ml of water, the mixture was left to separate into two layers, and the lower layer, consisting of a water solution, was withdrawn by means of a glass pipe inserted into the water solution layer. The remaining upper layer was treated again in the same manner as that mentioned above. The remaining upper layer, con- 49 were carried out except that the cis-1,4-polybutadiene was replaced by the same low cis-1,4-polybutadiene as that described in Examples 12 to 16, and the degree of epoxidization of the epoxidized polymer was 26 molar %.

It was confirmed by means of the $^1$H-NMR analysis that the ring-opened polymer was completely free from epoxy methine protons.

The solubilities of the resultant ring-opened polymer and the non-modified polymer in various solvents are indicated in Table 7.

EXAMPLE 51

The same procedures as those described in Example 49 were carried out except that the cis-1,4-polybutadiene was replaced by a high molecular weight crystalline 1,2-polybutadiene having an 86 molar % 1,2-addition structure, a melting point of 139° C., and a reduced viscosity of 1.19, the epoxidizing reaction mixture was prepared by using 0.3 mole of acetic acid in place of formic acid, 0.2 mole of hydrogen peroxide in the form of a 60 weight % aqueous solution, 1% by weight of a stabilizer consisting of 2,6-di-tert-butyl-p-cresol based on the weight of the polymer, and chloroform in place of toluene.

The epoxidized polymer had a degree of epoxidization of 21 molar %.

In the $^1$H-NMR analysis, it was found that the ring-opened polymer was completely free from epoxy methine and methylene protons.

The solubilities of the resultant ring-opened polymer and the non-modified polymer in various solvents are indicated in Table 7.

EXAMPLE 52

The same procedures as those described in Example 49 were carried out except that in the epoxidizing step, 0.4 mole of lactic acid and 0.4 mole of hydrogen peroxide in the form of 60 weight % aqueous solution were used and the epoxidizing temperature was 60° C.

The degree of epoxidization of the epoxidized polymer was 30 molar %.

In the $^1$H-NMR analysis, the ring-opened polymer contained no epoxy methine protons.

The solubilities of the resultant ring-opened polymer in various solvents are shown in Table 7.

EXAMPLE 53

The same procedures as those described in Example 51 were carried out, except that the epoxidizing reaction mixture contained 0.2 mole of acetic acid, 0.2 mole of hydrogen peroxide in the form of 30 weight % aqueous solution, and 3 g of a cation exchange resin grains (produced by Rohn & Hass Co. and available under the trademark AMBERLITE IR-120), and the epoxidizing reaction was carried out at a temperature of 40° C. for 5 hours.

The degree of epoxidization of the epoxidized polymer was 20%.

The cation exchange resin grains were separated from the reaction mixture by filtering the reaction mixture through a 60 mesh metal screen, after the epoxidizing reaction was completed.

The results of the $^1$H-NMR analysis confirmed that no epoxy methine protons were retained in the ring-opened polymer.

The solubilities of the ring-opened polymer in various solvents are shown in Table 7.

EXAMPLES 54 TO 58

In each of Examples 54 to 58, the same procedures as those described in Example 1 were carried out except that the cis-1,4-polybutadiene (UBEPOL #150) was replaced by 13.62 g (0.2 mole of monomer units) of a high cis-polyisoprene rubber having a 98.1 molar % cis-1,4-addition structure, a 1.9% 3,4-addition structure, and a Moone viscosity $ML_{1+4}$ of 90 at 100° C. The rubber was produced by Kuraray Isoprene Chemical Co., available under the trademark KURAPRENE IR-10, and had been masticated with rollers to reduce the Mooney viscosity thereof to the level of 60. In the epoxidizing step, formic acid was used in an amount of 1.85 g (0.04 mole), the 30 weight % hydrogen peroxide aqueous solution was used in an amount of 45.35 g (0.4 mole of hydrogen peroxide), and the degree of epoxidization of the epoxidized polyisoprene was 39 molar %; and in the ring-opening step, the dry weight of the epoxidized polymer was about 7 g, pyridine was used in an amount of 120 ml, the carboxylic acid indicated in Table 8 was used in an amount of 0.1 mole, and the ring-opening temperature was 100° C.

In each example, it was confirmed by means of the $^1$H-NMR analysis that the resultant ring-opened polymer was substantially free from epoxy methine protons.

The solubilities of the resultant polymers and the non-modified polyisoprene rubber (which had been masticated to a Mooney viscosity of 60) in various solvents are shown in Table 8.

EXAMPLES 59 TO 61

In each of Examples 59 to 61, the same procedures as those described in Example 54 were carried out except that the polyisoprene was replaced by 13.62 g of natural rubber.

The natural rubber used was one refined in such a manner that a ribbed smoked rubber sheet which had passed RSS-1 was masticated with rollers to an extent such that the Mooney viscosity $ML_{1+4}$ (100° C.) thereof was reduced to the level of 35, the masticated rubber was dissolved in toluene, the solution was filtered through a 100 mesh metal screen, the filtered solution was mixed into a large amount of methyl alcohol so as to cause the rubber to deposit, and the deposit was collected and dried.

The degree of epoxidization of the epoxidized natural rubber was 40 molar %.

In each example, in the ring-opening step, the carboxylic acid indicated in Table 8 was used.

TABLE 7

| Example No. | Degree of epoxidization of epoxidized polymer (molar %) | Type of carboxylic acid used in ring-opening step | Solubility of resultant hydrophilic polymer in various solvents | | | | | | | |
| --- | --- | --- | --- | --- | --- | --- | --- | --- | --- | --- |
| | | | Water | Methyl alcohol | Ethyl alcohol | Diethyl ether | Acetone | n-Hexane | Benzene | Xylene |
| Example 49 | 29 | Acetic acid | 1 | 1 | 1 | 3 | 3 | 3 | 3 | 3 |
| Control non-modified polymer | — | — | 3 | 3 | 3 | 1 | 3 | 1 | 1 | 1 |
| Example 50 | 26 | Acetic acid | 2 | 1 | 1 | 3 | 3 | 3 | 3 | 3 |
| Control non-modified polymer | — | — | 3 | 3 | 3 | 1 | 3 | 1 | 1 | 1 |
| Example 51 | 23 | Acetic acid | 1 | 1 | 1 | 3 | 3 | 3 | 3 | 3 |
| Control non-modified polymer | — | — | 3 | 3 | 3 | 3 | 3 | 2–3 | 1 | 1 |
| Example 52 | 30 | Lactic acid | 1 | 1 | 1 | 3 | 3 | 3 | 3 | 3 |
| Example 53 | 20 | Acetic acid | 1 | 1 | 1 | 3 | 3 | 3 | 3 | 3 |

It was found in the ¹H-NMR analysis that the resultant ring-opened natural rubber was free from the epoxy methine protons.

The solubilities of the ring-opened natural rubber in various solvents are indicated in Table 8.

TABLE 8

| Example No. | Degree of epoxidization of epoxidized polymer (molar %) | Type of carboxylic acid used in ring-opening step | Solubility of resultant hydrophilic polymer in various solvents | | | | | |
|---|---|---|---|---|---|---|---|---|
| | | | Water | Methyl alcohol | Ethyl alcohol | n-Hexane | Benzene | Xylene |
| Example | | | | | | | | |
| 54 | 39 | Acetic acid | 1 | 1 | 1 | 3 | 3 | 3 |
| 55 | " | Propionic acid | 2 | 1 | 1 | 3 | 3 | 3 |
| 56 | " | Lactic acid | 1 | 1 | 1 | 3 | 3 | 3 |
| 57 | " | Glycollic acid | 1 | 1 | 1 | 3 | 3 | 3 |
| 58 | " | Benzoic acid | 2 | 1 | 1 | 3 | 3 | 3 |
| Control non-modified polymer | — | — | 3 | 3 | 3 | 1 | 1 | 1 |
| Example | | | | | | | | |
| 59 | 40 | Acetic acid | 1 | 1 | 1 | 3 | 3 | 3 |
| 60 | " | Lactic acid | 1 | 1 | 1 | 3 | 3 | 3 |
| 61 | " | Glycollic acid | 1 | 1 | 1 | 3 | 3 | 3 |
| Control non-modified natural rubber | — | — | 3 | 3 | 3 | 2 | 1 | 1 |
| Example | | | | | | | | |
| 62 | 34 | Acetic acid | 1 | 1 | 1 | 3 | 3 | 3 |
| 63 | " | Lactic acid | 1 | 1 | 1 | 3 | 3 | 3 |
| 64 | " | Glycollic acid | 1 | 1 | 1 | 3 | 3 | 3 |
| Control non-modified polymer | — | — | 3 | 3 | 3 | 1 | 1 | 1 |
| Comparative Example 3 | 3 | Acetic acid | 3 | 3 | 3 | 2 | 1 | 1 |
| Comparative Example 4 | " | Lactic acid | 3 | 3 | 3 | 2 | 1 | 1 |

The solubilities of the ring-opened natural rubber and the non-modified, masticated natural rubber in various solvents are shown in Table 8.

EXAMPLES 62 TO 64

In each of Examples 62 to 64, the same procedures as those described in Example 54 were carried out except that the polyisoprene (KURAPRENE IR-10) was replaced by a high cis-polyisoprene rubber having a 94 molar % 1,4-addition structure, an average molecular weight of 47,000, and a melt viscosity of 4,800 poises determined by a B-type viscosity meter at a temperature of 38° C., (the polymer was produced by Kuraray Isoprene Chemical Co. and was available under the trademark KURAPRENE LIR-50), the degree of epoxidization of the epoxidized polymer was 34 molar %, and the carboxylic acid indicated in Table 8 was used in the ring-opening step.

In the ¹H-NMR analysis, it was found that the resultant ring-opened polymer was substantially free from epoxy methine protons.

The solubilities of the ring-opened polymer and the non-modified polymer in various solvents are indicated in Table 8.

COMPARATIVE EXAMPLES 3 AND 4

In Comparative Examples 3 and 4, the same procedures as those mentioned in Examples 59 and 60, respectively, were carried out except that the epoxidizing reaction was carried out by using 0.01 mole of formic acid and 0.04 mole of hydrogen peroxide to an extent that the degree of epoxidization of the epoxidized natural rubber was 3 molar %.

EXAMPLE 65

The same procedures as those described in Example 54 were carried out except that in the ring-opening step, the acetic acid was replaced by oxalic acid.

Thirty minutes after the start of the ring-opening reaction, the resultant ring-opened polymer deposited from the reaction mixture and, therefore, the reaction was stopped short.

The resultant ring-opened polymer was water-soluble.

We claim:
1. A process for producing a hydrophilic polymer, comprising the step of:
    epoxidizing a diene polymer material consisting of at least one member selected from the group consisting of rubber polymers which have a molecular weight of 10,000 or more and contain a 1,4-addition structure in a molar content of 85% or more based on the entire molar amount of double bonds contained therein, and crystalline 1,2-polybutadiene polymers which have a melting point of from 60° C. to 170° C., and a reduced Viscosity ($\eta sp/c$) of 0.2 or more determined in a tetrahydronaphthalene solution in a concentration of 200 mg/100 ml at a temperature of 100° C., and contain a 1,2-addition structure in a molar content of 75% or more based on the entire molar amount of double bonds contained therein, to an extent such that the degree of epoxidization of said rubber polymers is in the range of from 5% to 60% and the degree of epoxidization of said crystalline 1,2-polybutadiene is in the range of from 5% to 45%; and
    ring-opening at least a portion of the epoxy rings in the resultant epoxidized polymeric material by heating it in the presence of a tertiary amine and a carboxylic acid.

2. The process as claimed in claim 1, wherein said rubber polymers are selected from the group consisting of natural rubber and synthetic rubber polymers.

3. The process as claimed in claim 2, wherein said synthetic rubber polymers are selected from the group consisting of 1,4-polybutadiene polymers, polyisoprene polymers, styrene-butadiene copolymers and acrylonitrile-butadiene copolymers.

4. The process as claimed in claim 1, wherein said diene polymer material is epoxidized with an epoxidizing agent consisting of at least one member selected from the group consisting of combinations of carboxylic acids with peroxide compounds and carboxylic peracids.

5. The process as claimed in claim 4, wherein in said epoxidizing step, said carboxylic acid is selected from saturated carboxylic acids having 1 to 10 carbon atoms.

6. The process as claimed in claim 4, wherein said peroxide compound is hydrogen peroxide.

7. The process as claimed in claim 1, wherein said epoxidizing step is carried out in an inert organic medium.

8. The process as claimed in claim 7, wherein said organic medium comprises at least one liquid organic compound selected from the group consisting of hydrocarbons and halogenated hydrocarbons.

9. The process as claimed in claim 4, wherein in said epoxidizing step, said carboxylic acid and peroxide compound are used in amounts of 0.01 to 5 moles and 0.1 to 5 moles, respectively, per 100 g of said polymeric material.

10. The process as claimed in claim 4, wherein said epoxidizing step is carried out at a temperature of from 5° C. to 90° C.

11. The process as claimed in claim 4, wherein the resultant reaction mixture of said epoxidizing step is washed with water to remove the residual peroxide compound therefrom.

12. The process as claimed in claim 4, wherein said carboxylic acid used in the epoxy ring-opening step is selected from saturated carboxylic acids having 1 to 10 carbon atoms.

13. The process as claimed in claim 1, wherein said tertiary amine used in the epoxy ring-opening step is selected from heterocyclic tertiary amines, aliphatic tertiary amines, and aromatic tertiary amines.

14. The process as claimed in claim 1, wherein the epoxy ring-opening step is carried out in an inert organic medium.

15. The process as claimed in claim 13, wherein said inert organic medium comprises at least one liquid organic compound selected from the group consisting of hydrocarbons and halogenated hydrocarbons.

16. The process as claimed in claim 1, wherein the epoxy ring-opening step is carried out at a temperature of from 40° C. to 160° C.

17. The process as claimed in claim 1, wherein the epoxy ring-opening step is carried out to an extent such that said epoxy rings in a molar amount corresponding to 5% to 60% of the entire molar amount of the double bonds contained in said rubber polymers and to 5% to 45% of the entire molar amount of the double bonds contained in said 1,2-polybutadiene polymers are ring-opened.

* * * * *